Oct. 11, 1927.
W. A. ZEIDLER
1,645,035
SCISSORS
Filed Aug. 21, 1925
2 Sheets-Sheet 2
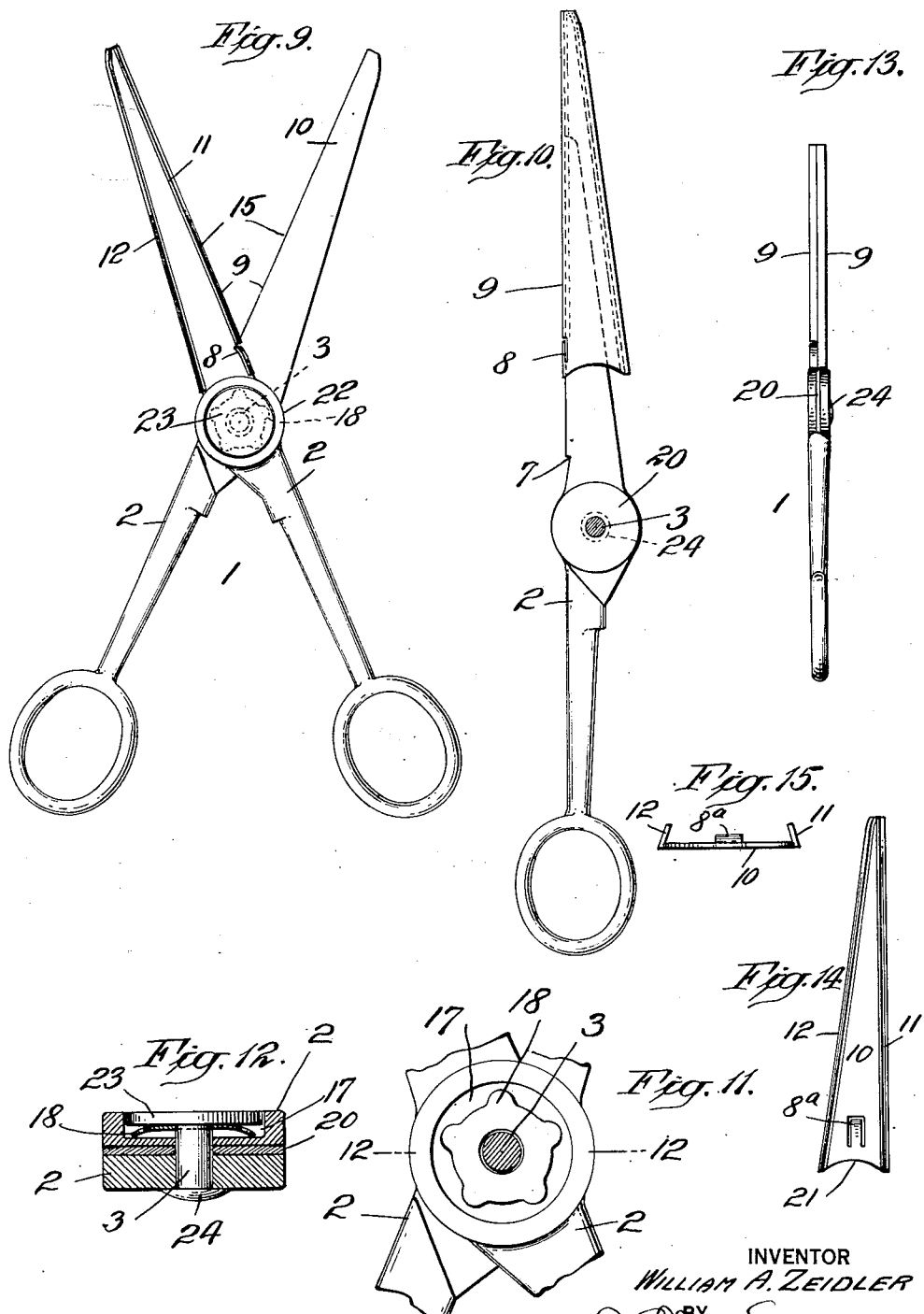
INVENTOR
WILLIAM A. ZEIDLER
BY
ATTORNEY Patented Oct. 11, 1927.

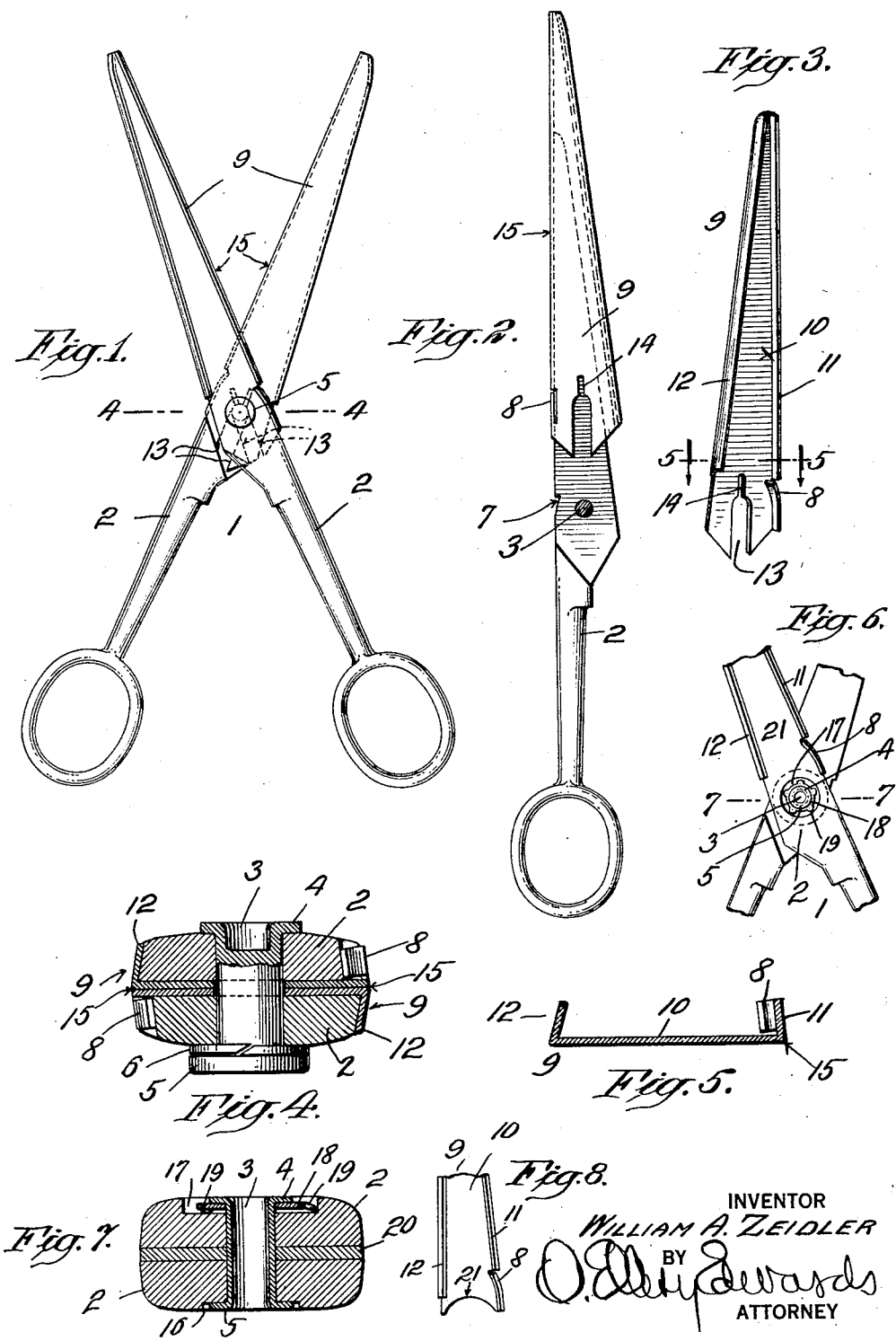

1,645,035

UNITED STATES PATENT OFFICE.

WILLIAM A. ZEIDLER, OF NEW YORK, N. Y., ASSIGNOR TO HURLBURT RESEARCH CORPORATION, OF NEW YORK, N. Y., A CORPORATION OF DELAWARE.

SCISSORS.

Application filed August 21, 1925. Serial No. 51,579.

The object of my invention is to provide an article of this class which will always cut true and cut easily because it is provided with removable blades and a suitable pivot which keeps the cutting edges of the blades in right relation at all times and when the blades become dull they may be easily removed and replaced. This object is accomplished by my invention, several embodiments of which are hereinafter set forth.

For a more detailed description of my invention, reference is to be had to the accompanying drawings, forming a part hereof, in which Figure 1 is a plan view of one embodiment of my invention.

Figure 2 shows a scissors with one blade partially removed therefrom.

Figure 3 shows a removable blade detached from a scissors.

Figure 4 is a sectional view taken on the line 4/4 of Figure 1.

Figure 5 is a sectional view taken on the line 5/5 of Figure 3, the section being enlarged.

Figure 6 is a plan view showing a pair of scissors provided with a modified form of pivot.

Figure 7 is a sectional view taken on the line 7/7 of Figure 6.

Figure 8 shows a modified form of scissor blade to fit the form of scissors shown in Figure 6.

Figure 9 is a plan view of a further modification with an enlarged pivot, the blades being the same as shown in Figures 6 and 8.

Figure 10 shows the structure of Figure 9, parts being removed to more clearly reveal the details.

Figures 11 and 12 show the pivotal construction of the structure shown in Figures 9, 10 and 13, Figure 12 being taken on the line 12/12 of Figure 11.

Figure 13 is an edge view of one embodiment of my invention where the pivot of Figure 9 is employed and the blades of Figure 6, except that the blades are straight on their cutting edges and not curved, and Figures 14 and 15 show a modified blade.

Throughout the various views of the drawings, similar reference characters designate similar parts.

In all embodiments of my invention, my improved scissors 1 are composed of two scissor elements 2 and a pivot 3, to which are added removable blades 9 as will appear below.

In the embodiment of my invention shown in Figures 1 to 5 inclusive, the pivot 3 is a solid pivot with an open end which is flanged at 4 to cover a scissor 2, as shown, and at its other end, the pivot is provided with a head 5 which engages a spring 6 so as to hold the parts on the pivot in proper relation. Each scissor is provided with a notch 7 which receives a tongue 8 of the removable blade 9.

Each removable blade 9 has a flat portion 10 and two flanges 11 and 12 and in the embodiment now under consideration, it also has a slot 13 at the pivot end which provides room for the pivot 3 and also a narrower slot 14 at the inside end of the slot 13, so that the walls of the slot 13, at their outer ends, may converge so as to hold against the pivot 3 with a frictional contact. The flange 11 of each blade 9 is bent abruptly over the flat part 10 and ground so as to have a cutting edge 15 and the other flange 12 is curved near its outer edge so as to fit snug to the scissor element to which it is attached.

The flange 12, while rising from the base 10, at substantially the same angle as the flange 11, lies in a line at an angle to the cutting edge 11, throughout its entire length, thus giving a fit upon the scissor member which is angularly formed to receive it. This arrangement, in conjunction with the snap lock formed in the notch 7, and tongue 8, snugs the removable blade to the scissors element.

In the modification shown in Figures 6, 7 and 8, the structure is slightly varied. Here the pivot 3 is a hollow rivet which is flanged at 4 and 5 as shown, to hold the scissor elements 2 in proper relation and under the flange 4 is placed a suitable spring washer 18 with prongs 19. The flange 5 rests in a recess 16 and the flange 4 and washer 18 rest in a recess 17 so that the pivot does not project beyond the scissor elements. The scissor elements 2 are separated by a washer 20 and, therefore, it is necessary to modify the blade 9 which is used in this embodiment of my invention. This change is not great, the slot 13 being done away with and the same is true of the slot 14 and the inner end of the blade 9 is curved so as to fit the washer as indicated at 21 in Figure 8.

In Figures 9 to 13 inclusive is shown a further modification of my invention. Here a structure is employed which has a pivot which permits a turning movement only and no twisting movement such as is common in scissors of the ordinary type. To secure this result, each scissor element 2, at its pivot, is enlarged as shown at 22 so as to provide ample room for a recess 17 that holds the large head 23 of the pivot 3. This large head 23 covers the spring washer 18 and completely conceals the same. The small head 24 of the pivot 3 is spun or riveted or swaged as shown in Figure 12 so as to properly hold the parts in a pivotal relation so as to prevent all other movement than a pivotal movement between the scissor elements 2.

In the structure shown in Figure 13, it will be noted that the blades 9 fit close together from end to end and are not bowed in the usual manner. This is possible and suitable where the blades are not too long as, for example, where they are not over an inch and a half long. Such blades are always kept in close contact when the scissors are operated because of the broad pivot which is employed in these scissors. The result is that the scissors may be used by surgeons and others for all cutting where it is very desirable that nothing shall slip between the scissor elements while the scissors are in operation.

In Figures 13 and 14, is shown a modified form of blade which is the same as shown in Figure 8, except that, instead of using the tongue 8 struck from a flange, a tongue 8$^A$ is struck from the bottom 10 as shown, which is adapted to enter a suitable recess, not shown, in a scissor element 2.

In view of the foregoing, the use and operation of my improved scissors will be readily understood. These scissors are used in the conventional manner and when they get dull, an instrument is inserted under the tongue 8 until it is out of the notch 7 and then the blade may be removed and replaced by another and sharper blade. This replacement may be made from time to time, as required. It will be noted that the scissor elements 2 may be made of any suitable material which is desirable and preferably one that will not rust or corrode and which is strong enough to sustain the blades and the blades 9 may be made of hard sheet steel which is formed and ground before tempering and tempered thereafter so that the cutting edge 15 will be long retained as compared with the corresponding cutting edge of ordinary scissors which must be much softer because of the difficulties incidental to forging. It will also be noted that the elastic washer, acting as it does on a broad base, and the large pivot, force the two scissor elements to turn, one on the other, and have no other movement so that the cutting edges 15 of the scissors always strike true. They will strike so true that when short blades are employed, as above stated, the scissors will strike true even though there may be no bowing. While I have shown and described some embodiments of my invention, it is obvious that it is not restricted thereto but is broad enough to cover all structures which come within the scope of the annexed claims.

Having thus described my invention, what I claim is:

1. In a device of the class described, two scissor elements connected by a pivot, a removable blade on each of said elements, said blade having two flanges, one of which is at the cutting edge and the other opposite the cutting edge and at an angle thereto whereby each blade is properly held on its scissor element, and a snap lock formed integrally with each blade to lock it to its element.

2. In a device of the class described, two scissor elements and a pivot connecting the same, a removable blade mounted on each of said elements and flanges at each side of each blade, one flange of each blade being so shaped as to form a substantially straight cutting edge and the other flange being angularly disposed thereto and adapted to hold the blade in opposition to the cutting flange, and means integral with the blades for positively holding each blade in place on its scissor element.

3. In a device of the class described, two scissor elements connected by a pivot, a removable blade mounted on each scissor element and held in place by means of flanges, one of said flanges having a cutting edge, the other angularly disposed to said cutting edge, said scissors having an enlarged portion about the pivot and a washer about said pivot and between said scissor elements, spring tensioned pivot resiliently holding the washer whereby the scissor elements are held in proper articulating relation.

4. In a device of the class described, two scissor elements connected by a pivot, and removable blades with flanged sides mounted on said scissor elements, two of said flanged sides being shaped so as to provide cutting edges, a washer separating said scissor elements, enlargements of said scissor elements adjacent to the pivot, a head on said pivot resting in said recess and a spring washer between the head and scissor element and in the bottom of said recess, whereby the scissor elements are held in proper relation at all times and made to have a true turning movement about the pivot.

5. A removable blade for scissors, composed of a flat base, having two laterally extended flanges, one of said flanges being shaped so as to embrace the back of a scissor element angularly disposed to the cutting edge, the other being sharpened so as to form a cutting edge at the apex of the dihedral angle formed between the base and the flange and a snap lock integral with the blades for locking the same to the elements.

6. A removable blade for scissors, composed of a flat base, having two laterally extended flanges, one of said flanges being shaped so as to fit the back of a scissor element and the other being sharpened so as to form a cutting edge at the apex of the dihedral angle formed between the base and the flange, and a tongue struck from the removable blade and adapted to hold said blade in place.

In testimony whereof, I have hereunto set my hand this 14th day of August, 1925.

WILLIAM A. ZEIDLER.